United States Patent [19]

Browne et al.

[11] 4,088,635

[45] May 9, 1978

[54] POLYESTER MANUFACTURE

[75] Inventors: Anthony Arthur Briarly Browne; James Eric McIntyre, both of Harrogate, England

[73] Assignee: Imperial Chemical Industries Limited, London, England

[21] Appl. No.: 643,085

[22] Filed: Dec. 22, 1975

[30] Foreign Application Priority Data

Jan. 13, 1975 United Kingdom ................ 1349/75

[51] Int. Cl.² ............................................ C08G 63/00
[52] U.S. Cl. .............................. 260/78.41; 260/47 C; 260/75 EP
[58] Field of Search ............... 260/75 EP, 47 C, 78.41

[56] References Cited

U.S. PATENT DOCUMENTS

| 3,355,434 | 11/1967 | Milligan et al. | 260/75 EP |
| 3,725,461 | 4/1973 | Jamison | 260/475 P |
| 3,766,145 | 10/1973 | Thompson | 260/75 EP |

FOREIGN PATENT DOCUMENTS 1,387,335   3/1975   United Kingdom ............ 260/75 EP

*Primary Examiner*—Lucille M. Phynes
*Attorney, Agent, or Firm*—Cushman, Darby & Cushman

[57] ABSTRACT

The manufacture of a poly(alkylene arylene dicarboxylate) by reaction of an aromatic dicarboxylic acid in the solid state with an alkylene oxide wherein a major part of the reaction mass forms a solid phase throughout the reaction, in the presence of phosphorous acid as catalyst.

18 Claims, No Drawings

POLYESTER MANUFACTURE

The present invention relates to the manufacture of polyesters by reaction in the solid phase.

In our British Patent Specification No. 1,387,335 we describe a process for the manufacture of a poly(alkylene arylene dicarboxylate) wherein an aromatic dicarboxylic acid in the solid state is reacted with an ester-forming derivative of a diol having no free hydroxyl groups to form a poly(alkylene arylene dicarboxylate), wherein reaction conditions are so controlled that throughout the reaction a major part of the reaction mass forms a solid phase. It is further stated that in the case particularly of the use of ethylene oxide as a reactant, that is as the ester-forming derivative of a diol, the presence of a basic compound as catalyst for the initial esterification reaction is advantageous.

According to the present invention we provide a process for the manufacture of a poly(alkylene arylene dicarboxylate) wherein an aromatic dicarboxylic acid in the solid state is reacted with an alkylene oxide to form a poly(alkylene arylene dicarboxylate), reaction conditions being so controlled that throughout the reaction a major part of the reaction mass forms a solid phase, wherein the esterification reaction is catalysed by the presence of phosphorous acid or the reaction product of phosphorous acid with a constituent or constituents of the reaction mixture.

Preferably the catalyst is present throughout the esterification reaction.

Preferably phosphorous acid is added to the aromatic dicarboxylic acid at the start of the reaction.

The proportion of catalyst present should preferably be equivalent to at least 0.1% and not exceeding 5% of phosphorous acid by weight based on the dicarboxylic acid. More preferably, the catalyst should be equivalent to from 0.5% to 1.0% of phosphorous acid by weight on the dicarboxylic acid.

The polycondensation reaction may additionally be catalysed by the presence of a conventional polycondensation catalyst, for example a compound of antimony, germanium, titanium or cobalt. If used, the polycondensation catalyst may conveniently be added at the start of the reaction, although it may be added at a later stage.

Preferably the aromatic dicarboxylic acid should be in solid particulate form. Preferably solid particulate form should be retained throughout the reaction.

Preferably the whole of the reaction medium apart from the alkylene oxide should be solid.

However, we include the situation wherein a minor proportion of the condensed phase is liquid, provided that the bulk of the condensed phase retains a particulate form throughout the reaction. This liquid component, when it exists, may consist of a minor amount of a low-melting intermediate ester or oligomeric ester or of a minor amount of alkylene oxide absorbed into or condensed upon the solid particles. Similarly, minor amounts of catalytic additives may be present as liquid provided that the bulk of the condensed phase retains a particulate form.

Advantageously, the reaction may be carried out under fluidised bed conditions in order to improve uniformity of reaction conditions, to facilitate intimate contact between the particulate solid aromatic dicarboxylic acid and the alkylene oxide in the vapour state and to minimise adhesion of the particles by sintering.

In the term "poly(alkylene arylene dicarboxylate)" we include homopolyesters and also copolyesters in which a minor proportion of the alkylene groups and/or the arylene dicarboxylate groups are of structure different from that of the major proportion.

The advantages of solid phase polycondensation are well known. An advantage of the process of our invention is that since the esterification reaction also takes place in the solid phase, the polycondensation to form high molecular weight poly(alkylene arylene dicarboxylate) can be carried out without the need for intermediate solidification of a reaction melt followed by comminution to a suitable particle size. This is particularly advantageous when the solid phase remains in a particulate form.

Aromatic dicarboxylic acids for use in the process of our invention must melt at a temperature above the reaction temperature, preferably at a temperature at least 100° C above the reaction temperature. Particularly preferable for use in the invention are aromatic dicarboxylic acids with melting points above 300° C., such as terephthalic acid, naphthalene-2, 6-dicarboxylic acid, naphthalene-2,7-dicarboxylic acid, 1,2-diphenoxyethane-p,p'-dicarboxylic acid, 1,4-diphenoxy butane-p,p'-dicarboxylic acid, biphenyl-4,4'-dicarboxylic acid, diphenyl sulphone-4,4'-dicarboxylic acid, bibenzyl-4,4'-dicarboxylic acid, stilbene-4,4'-dicarboxylic acid, 1,2-di-p-carboxybenzoyloxyethane and 1,6-di-p-carboxybenzamido hexane. More than one such high-melting aromatic dicarboxylic acid may be present, subject to certain restrictions outlined later. Minor amounts of lower melting dicarboxylic acids, particularly aliphatic dicarboxylic acids of 2 to 8 carbon atoms, for example adipic acid, may be present but if more than about 10% of an acid melting below the reaction temperature is present a solid particulate structure can no longer be maintained.

The polyester produced by the process must melt at a temperature above the final polymerisation temperature. In practice this means that the polyester should preferably melt at a temperature above 200° C.

The alkylene oxide for use in the process of the present invention is preferably ethylene oxide.

The poly(alkylene arylene dicarboxylate) according to the process of the present invention is preferably poly(ethylene terephthalate).

It is a feature of the process of our invention that reaction of the dicarboxylic acid with the derivative of the diol and polycondensation occur simultaneously within the bed, so that polymer and unchanged aromatic acid are both present at an intermediate stage of the process, with only a minor amount of low-melting oligomeric species. This situation contrasts with conventional processes for polyester manufacture, in which a high concentration of low-melting oligomeric species is built up at an intermediate stage, and virtually all the free aromatic dicarboxylic acid is consumed before manufacture of polymeric species commences.

It is important to obtain a balance between esterification by the ester-forming derivative of the diol and polycondensation reactions such that the concentration of low-melting oligomeric species remains low. The temperature at which such a balance can be attained depends upon polymer structure, vapour feed rate, and catalyst concentrations, but will usually lie within the range 160°–240° C. It will be understood that where a separate final powder polymerisation is carried out the temperature of this step may be above 240° C. if the product melting point is sufficiently high, and also that our process may be carried out in such a way that the reaction temperature is increased as the degree of conversion into polymer increases, and in such cases the temperature in the latter stages may exceed 240° C.

The process may be carried out either batchwise or continuously.

The poly(alkylene arylene dicarboxylates) of our invention are suitable for the manufacture of fibres, films or mouldings.

In the following Examples of the present invention all parts are by weight.

EXAMPLE 1

Terephthalic acid (100 parts) in the form of particles of size passing a sieve of mesh aperture 300 $\mu$ and held on a sieve of mesh aperture 30 $\mu$ was slurried in a solution of phosphorous acid (0.5 part) in water and the water evaporated off with continued stirring. The solid residue was dried at 60° C. and 15 mm Hg pressure then charged into a pre-heated fluid bed reactor consisting essentially of a vertical cylinder with a sintered glass support near the foot, a gas inlet below the sintered glass support, and a baffle near the top to prevent entrainment of solid particles out of the reactor.

A thermocouple pocket just above the sintered glass support allowed measurement of the temperature in the fluidised bed. The reactor was surrounded by a cylindrical oven.

Heated nitrogen was passed through the reactor at atmospheric pressure at a rate of 7.5 parts per minute until the bed temperature settled at 235° C., then a mixture of hot nitrogen (5.6 parts per minute) and ethylene oxide (3.0 parts per minute) was passed through the reactor for 25 hours, the temperature being maintained at 235° C. throughout. Finally the bed was allowed to cool to room temperature with passage of nitrogen.

The product was poly(ethylene terephthalate) of intrinsic viscosity ($\eta$) 0.47 dl./g. (orthochlorophenol at 25° C.).

EXAMPLES 2, 3, 4, 5 AND 6

These examples were carried out basically according to Example 1, with the distinctions indicated in Table I. Where a value is shown for oligomer content, this was determined by extraction with hot chloroform. In Example 1 the extent to which the yield fell short of 100% was due to mechanical losses; there was virtually no unreacted dicarboxylic acid or other acid products present in the product. In the other examples acid products were extracted with cold 10% aqueous sodium carbonate solution, followed by washing with water, cold 2 N hydrochloric acid, and water, and the resultant product dried. The results are shown in Table I.

EXAMPLES 7, 8, 9, 10 AND 11

These examples were carried out basically according to Example 1 with the distinctions indicated in Table 2, and with the further distinction that in each example there was present in the starting terephthalic acid antimony trioxide corresponding to 410 parts per million of antimony. The results are shown in Table II.

TABLE I

| Ex. | Catalyst Concentration (phosphorous acid) %* | Reaction Time hours | Ethylene Oxide Partial Pressure Atmos. | Reaction Temperature ° C. | Ethylene Oxide Temperature ° C. | Oligomer Content of Product % | Polyester Yield % |
|---|---|---|---|---|---|---|---|
| 1 | 0.5 | 25 | 0.25 | 235 | 235 | 1.4 | 94 |
| 2 | 0.5 | 5 | 0.25 | 225 – 243 | 243 | 3.6 | 29.3 |
| 3 | 0.5 | 10 | 0.25 | 222 – 239 | 230 | 3.4 | 57.9 |
| 4 | 0.5 | 15 | 0.25 | 228 – 239 | 239 | 5.3 | 78.5 |
| 5 | 0.25 | 15 | 0.25 | 228 – 238 | 238 | 1.3 | 28.7 |
| 6 | 0.25 | 15 | 0.33 | 230 – 238 | 238 | 2.3 | 47.3 |

*In each case % is by weight, based on terephthalic acid.

TABLE II

| Ex. | Catalyst Concentration (phosphorous acid) %* | Reaction Time hours | Ethylene Oxide Partial Pressure Atmos. | Reaction Temperature ° C. | Ethylene Oxide Temperature ° C. | Oligomer Content of Product % | Polyester Yield % |
|---|---|---|---|---|---|---|---|
| 7 | 1.0 | 5 | 0.25 | 230 – 232 | 232 | 5.5 | 47.0 |
| 8 | 0.5 | 5 | 0.25 | 223 – 236 | 236 | 0.7 | 28.6 |
| 9 | 0.5 | 10 | 0.25 | 228 – 235 | 235 | 0.7 | 45.7 |
| 10 | 0.5 | 15 | 0.25 | 226 – 235 | 235 | 1.1 | 57.2 |
| 11 | 0.25 | 15 | 0.25 | 232 – 238 | 238 | 1.1 | 22.4 |

*In each case % is by weight, based on terephthalic acid.

EXAMPLES 12, 13 AND 14

Example 1 was repeated during germanium dioxide as catalyst, added to the terephthalic acid initially in proportion equivalent to 118 parts per million by weight based on the terephthalic acid. Further distinctions from Example 1 are shown in Table 3 together with the results of the experiments.

TABLE III

| Ex. | Initial Phosphorous Acid Conc'n %* | Initial Germanium Dioxide Conc'n ppm GeO$_2$ | Reaction Time Hours | Reaction Temperature ° C. | Ethylene Oxide Partial Pressure Atmos. | Oligomer Content of Product % | Polyester Content of Product % |
|---|---|---|---|---|---|---|---|
| 12 | 0.5 | 118 | 5 | 220 | 0.25 | 2.0 | 18.6 |
| 13 | 0.5 | 118 | 10 | 223 | 0.25 | 2.8 | 44.2 |

TABLE III-continued

| Ex. | Initial Phosphorous Acid Conc'n %* | Initial Germanium Dioxide Conc'n ppm GeO$_2$ | Reaction Time Hours | Reaction Temperature ° C. | Ethylene Oxide Partial Pressure Atmos. | Oligomer Content of Product % | Polyester Content of Product % |
| --- | --- | --- | --- | --- | --- | --- | --- |
| 14 | 0.5 | 118 | 15 | 223 | 0.25 | 1.8 | 67.1 |

*In each case % is by weight, based on terephthalic acid.

What we claim is:

1. A process for the manufacture of a poly(alkylene arylene dicarboxylate) wherein an aromatic dicarboxylic acid in the solid state is reacted with an alkylene oxide to form a poly(alkylene arylene dicarboxylate), reaction conditions being so controlled that throughout the reaction a major part of the reaction mass forms a solid phase, wherein the esterification reaction is catalysed by the presence of phosphorous acid or the reaction product of phosphorous acid with a constituent or constituents of the reaction mixture.

2. A process according to claim 1 in which the catalyst is present throughout the esterification reaction.

3. A process according to claim 1 in which phosphorous acid is added to the aromatic dicarboxylic acid at the start of the reaction.

4. A process according to claim 1 wherein the proportion of catalyst present is equivalent to at least 0.1% and not exceeding 5% by weight of the dicarboxylic acid.

5. A process according to claim 1 wherein the proportion of catalyst present is equivalent to at least 0.5% and not exceeding 1.0% by weight of the dicarboxylic acid.

6. A process according to claim 1 wherein the polycondensation reaction is additionally catalysed by the presence of a polycondensation catalyst.

7. A process according to claim 1 wherein the polycondensation reaction is additionally catalysed by the presence of a compound of antimony, germanium, titanium or cobalt.

8. A process according to claim 1 wherein the polycondensation is additionally catalysed by the presence of a compound of antimony.

9. A process according to claim 6 wherein the polycondensation catalyst is added at the start of the reaction.

10. A process according to claim 1 wherein the aromatic dicarboxylic acid is in solid particulate form.

11. A process according to claim 10 wherein solid particulate form is retained throughout the reaction.

12. A process according to claim 1 wherein the whole of the reaction medium, apart from the ethylene oxide, remains solid throughout the reaction.

13. A process according to claim 1 wherein the reaction is carried out under fluidised bed conditions.

14. A process according to claim 1 wherein the aromatic dicarboxylic acid is of melting point above 300° C.

15. A process according to claim 1 wherein the dicarboxylic acid is terephthalic acid, naphthalene-2:6-dicarboxylic acid, naphthalene-2:7-dicarboxylic acid, 1:2-diphenoxyethane-p,p'-dicarboxylic acid, 1:4-diphenoxybutane-p,p'-dicarboxylic acid, biphenyl-4:4'-dicarboxylic acid, diphenyl sulphone-4:4'-dicarboxylic acid, bibenzyl-4:4'-dicarboxylic acid, stilbene-4:4'-dicarboxylic acid, 1:2-di-p-carboxybenzoyloxyethane or 1:6-di-p-carboxybenzamido hexane.

16. A process according to claim 1 wherein the reactants are chosen so that the resultant polymer is of melting point above 200° C.

17. A process according to claim 1 wherein the alkylene oxide is vapourised into a chemically inert gas which is passed through the mass of aromatic dicarboxylic acid.

18. A process according to claim 1 wherein the reaction is carried out with the temperature within the range 160° to 240° C.

* * * * *